A. PRIDDLE.
FIREPROOF CONSTRUCTION.
APPLICATION FILED MAR. 5, 1909.
944,502.
Patented Dec. 28, 1909.
2 SHEETS—SHEET 1.
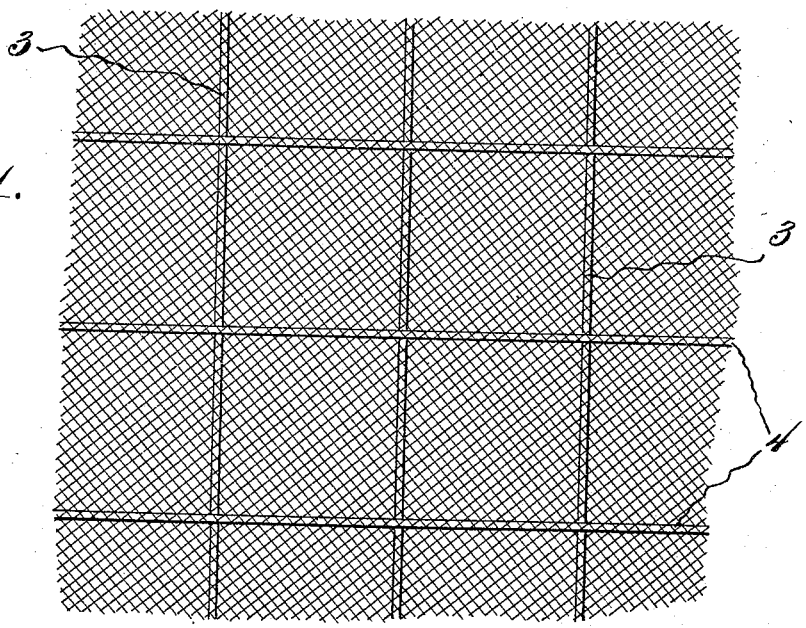
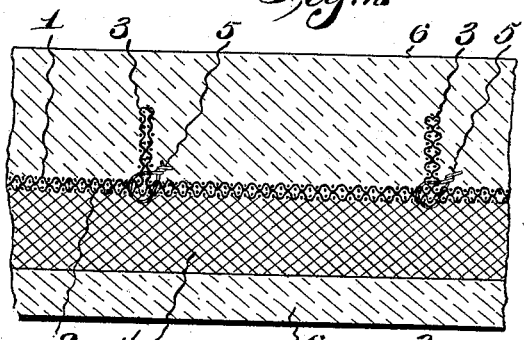
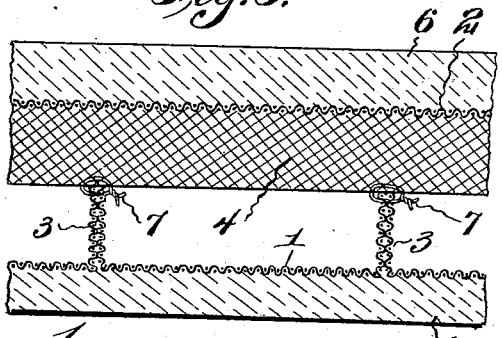
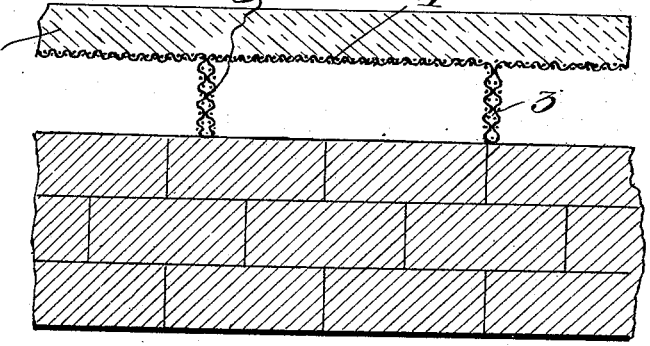
Witnesses
Louis R. Heinrichs
C. H. Giesbauer
Inventor
Arthur Priddle
by H. B. Willson & Co.
Attorneys A. PRIDDLE.
FIREPROOF CONSTRUCTION.
APPLICATION FILED MAR. 5, 1909.
944,502.
Patented Dec. 28, 1909.
2 SHEETS—SHEET 2.
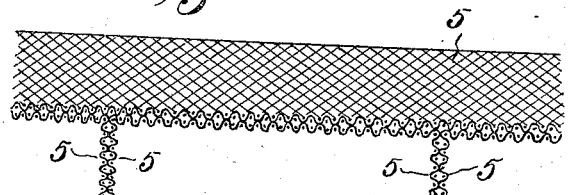
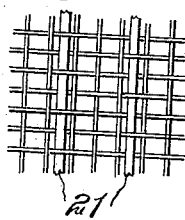
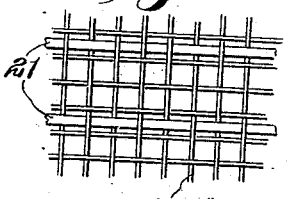
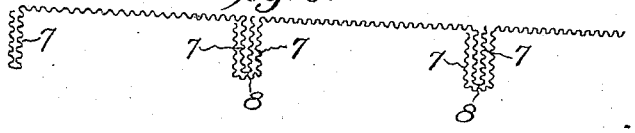
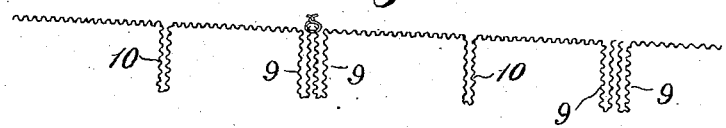
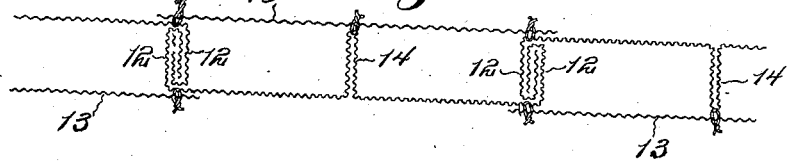
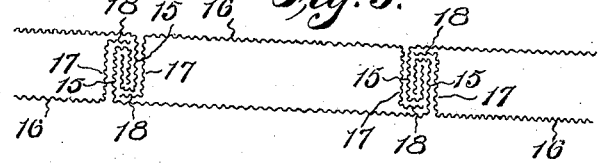
Witnesses
Louis R. Heinrichs
C. H. Giesbauer
Inventor
Arthur Priddle
By H. B. Willson & Co
Attorneys

UNITED STATES PATENT OFFICE.

ARTHUR PRIDDLE, OF SAN FRANCISCO, CALIFORNIA.

FIREPROOF CONSTRUCTION.

944,502.       Specification of Letters Patent.    Patented Dec. 28, 1909.

Application filed March 5, 1909. Serial No. 481,290.

*To all whom it may concern:*

Be it known that I, ARTHUR PRIDDLE, a citizen of the United States, residing at San Francisco, in the county of San Francisco and State of California, have invented certain new and useful Improvements in Fireproof Structures; and I do declare the following to be a full, clear, and exact description of the invention, such as will enable others skilled in the art to which it appertains to make and use the same.

This invention relates to improvements in fireproof structure for walls, partitions, floors and the like.

The object of the invention is to provide a simple, strong and durable fireproof structure for building walls, partitions, floors and the like, in which the metal lathing is so constructed and arranged as to be stiffened and self-supporting, and which may be arranged to form either a solid or hollow structure.

With this object in view, the invention consists of certain novel features of construction, combination and arrangement of parts as will be more fully described and particularly pointed out in the appended claims.

In the accompanying drawings, Figure 1 is a side view of a section of fireproof structure constructed in accordance with the invention; Fig. 2 is a cross sectional view of the same showing the arrangement of the lathing and plastering to form a solid wall, partition or floor structure; Fig. 3 is a similar view showing the arrangement of the parts to form a hollow structure; Fig. 4 is a cross sectional view showing a single form and arrangement of the device when used in connection with a masonry wall or the like; Fig. 5 is a sectional view of the modified construction of the lathing arranged to form a solid partition; Figs. 6 and 7 are similar views showing slightly different forms and arrangements of the construction shown in Fig. 5; Figs. 8 and 9 are sectional views of another form of invention wherein the inwardly turned sections of the metal are interlocked; Fig. 10 is a detail plan view of a section of wire lathing fabric showing the arrangement of stiffening rods running through and woven into the same in one direction; Fig. 11 is a similar view showing the stiffening rods running in a direction at right angles to that shown in Fig. 10; and Fig. 12 is a detail sectional view showing the arrangement of the form of fabric illustrated in Figs. 10 and 11 arranged in accordance with the invention to form a self-supported partition or similar structure.

In the embodiment of the invention, I provide a metal fabric which may be of any suitable construction, such as expanded metal, woven wire, perforated sheet metal or similar material. I preferably employ, however, sheets of expanded metal which may be as heavy or light in construction as necessary, or desirable, for the work or structure to be formed thereby.

In the application of the fabric to form a wall, partition or other structure, I employ two sheets or layers 1 and 2 of the same, one sheet of which is provided with a series of vertically disposed stiffening ribs 3, while the other sheet or layer is provided with horizontally disposed stiffening ribs 4. The ribs 3 and 4 are formed by bending the material upon itself to form laterally projecting folds as shown. The folds are arranged in parallel relation and may be of any suitable number and spaced apart at such distances as may be desired, the number and distance apart of the folds or ribs depending upon the stiffness required for the material in the construction of the work at hand.

In arranging the sheets or layers of material to form a solid wall, partition or the like, the flat sides of the sheets are placed together with the vertical ribs of the one sheet projected outwardly on one side of the wall and the horizontal ribs 4 projected outwardly from the other sheet on the opposite side of the wall, as is clearly shown in Fig. 2 of the drawings. The sheets of fabric when thus arranged are securely bound together by suitable ties or clips 5. After the sheets or layers of fabric have thus been securely bound together, the plaster, 6, is applied to one or both sides of the same, thus completing the wall, partition or the like, without the necessity of employing other support for the fabric than that formed by the ribs 3 and 4, which run at right angles to each other on the opposite sides of the fabric layers.

To form a hollow wall, partition or the like, the position of the sheets of fabric is reversed or, in other words, the outer edges of the ribs are brought together and securely bound or fastened by ties or clips 7. When the parts are thus arranged, the ribs of the fabric on one side will engage the ribs of the fabric of the other side at right angles and the smooth sides of the fabric will be on the outer sides of the partition. The ribs or folds, 3 and 4, are of such width as to provide the required space between the opposite walls formed by the sheets or layers of fabric. When the parts are arranged to form a hollow wall, the plaster is adapted to be applied to the smooth sides of the fabric on one or both sides of the wall or partition.

The hollow construction of the wall or partition is clearly shown in Fig. 3 of the drawings, and like the solid wall shown in Fig. 2 will require under ordinary conditions no further studs or supports than that provided by the ribs or folds formed in the fabric.

In the construction of some walls or floors, it may be desirable to use only a single side or layer of the material, and in the single form, the rib or fold will take the place of any other metal furring when used against walls or the like, this latter arrangement of the fabric being clearly illustrated in Fig. 4 of the drawings.

In Fig. 5 of the drawings is shown a modified form of the invention, in which the lathing is formed in strips or sheets, the edges and ends of which are bent at right angles to provide outwardly projecting stiffening flanges, 5, which, when the strips or sheets are arranged in position, will be engaged with each other and may be secured together by ties, clips, or other suitable fastening devices, 6. In arranging the lathing to form a solid partition, the smooth sides of the two layers are brought together and fastened in any suitable manner, the flanges 5 of one layer extending vertically, while the flanges of the adjoining layer extend horizontally, or at right angles to the vertical flanges. When it is desired to form a hollow partition with this form of lathing, the edges of the oppositely extending flanges of the layers are brought together and fastened in any suitable manner similar to the construction shown and described in connection with Fig. 3 of the drawings.

In Fig. 6 of the drawings is shown another modified form of the device in which the strips or sheets of metal are provided on their opposite edges with right-angularly bent flanges 7, which are folded outwardly upon themselves as shown at 8, the fold in the flange on one edge of the metal being slightly wider than that of the opposite side whereby, when the edges of the sheets or strips are brought together, the folded flange of one strip is engaged with or hooked into the adjacent folded flange of the next adjoining strip, thus forming a stiffening rib of double strength. The folded flanges when thus engaged may be fastened together with ties or other suitable fastening devices.

In Fig. 7 is shown a modified arrangement of the form of the device shown in Fig. 6. In Fig. 7 the sheets or strips of metal are provided with folded right-angularly disposed flanges 9 which, when the strips are arranged for use, are adapted to be brought together and tied in the same manner as shown in Fig. 5 of the drawings. In this latter form of the device, the strips or sheets are shown as provided with a centrally disposed right-angularly projecting fold 10 which forms an additional reinforcing or stiffening rib.

In Fig. 8 of the drawings is shown another modified form of the device in which the sheets are provided with right-angularly bent, inwardly turned flanges 12, said flanges being adapted to be engaged with each other to form interlocking connections as shown. When the sheets or strips are thus arranged and connected, each alternate strip will be disposed on the opposite side of the flange edges 12 thus leaving alternate open spaces on the opposite sides of the partition and between the interlocked edges of the strips. These spaces are preferably covered by flat sheets of lathing 13 which are secured in place by tying or other suitable means, thus providing a smooth plastering surface on each side of the partition. The strips or sheets shown in this latter form of the device may be also provided with centrally disposed, right-angularly projecting folds, 14, which provide additional stiffening ribs.

In Fig. 9 the sheets or strips of lathing are provided with interlocking folded flanges 15, which are similar in construction and arrangement to the flanges shown in Fig. 8. The alternate open spaces on the opposite sides of the partition in this form of the device are covered by plates or strips 16, the opposite edges of which are bent laterally at right-angles, as shown, to form spacing flanges 17, said flanges being bent outwardly at their outer edges to form retaining flanges 18, which are inserted between the folded edges of the interlocked flanges of the sheets and the adjacent side of the sheet, thus holding said plate 16 in position without the use of further fastening devices.

In Fig. 10 of the drawing is shown a woven wire lathing fabric 20 in which is arranged at suitable intervals stiffening rods 21, said rods being woven in between the strands of the material forming the lathing, whereby the same is made rigid.

In Fig. 11 of the drawings, the stiffening rods 21 are shown as running through the lathing material in a direction at right-angles to that shown in Fig. 10. In arranging this form of the lathing fabric to form a partition, or other structure, the sheets or strips of the same are placed together with the rods of one sheet running across the rods of the other sheet, as clearly shown in Fig. 12 of the drawings. The sheets when thus arranged are suitably tied or fastened together and form a self-supporting structure adapted for use as partitions, walls, or similar structures.

In all the forms of the invention herein shown and described, the idea or principle of arranging the stiffened material to provide a structure which will be self-supporting and sufficiently rigid to form a partition without the use of studding or any other supplemental supports is carried out.

Having described my invention, what I claim as new and desire to secure by Letters-Patent, is:

1. A fire-proof wall, partition or the like formed of sheets of metal lathing, means to secure said sheets together, laterally projecting ribs formed in said sheet, said ribs being arranged at right angles to each other on the opposite side of the partition, wall or the like, and concrete connecting each sheet to form the complete wall.

2. A fire-proof wall, partition or the like formed of sheets of metallic lathing, means for securing said sheets together, laterally projecting stiffening ribs formed by folding said material, the ribs on one side of said partition extending at right angles to the ribs on the opposite side, and concrete connecting each sheet to form the complete wall.

3. A hollow fire-proof wall, partition or the like formed of sheets of metallic lathing, stiffening ribs formed by folding sections of material, means for securing the outer edges of said ribs together, thereby forming spacing strips to support the sheets, which are thus spaced apart and form supports or lathing, and concrete secured to the pieces for forming the complete walls.

In testimony whereof I have hereunto set my hand in presence of two subscribing witnesses.

ARTHUR PRIDDLE.

Witnesses:
JOAN S. BARUCH,
CHARLES FRANCEE.